United States Patent Office 3,822,298
Patented July 2, 1974

3,822,298
PREPARATION OF 3α-HYDROXY-5α-STEROIDS
John Charles Clayton, 138 Twyford Road, Harrow, Middlesex, England; Peter James Faulkner, 8 Crispin Way, Farnham Common, Slough, Buckinghamshire, England; William Reginald Jones, 35 Barbican Road, Greenford, Middlesex, England; and Gordon Hanley Phillipps, 8 Sudbury Hill Close, Wembley, Middlesex, England
No Drawing. Filed Nov. 10, 1972, Ser. No. 305,246
Claims priority, application Great Britain, Nov. 11, 1971, 52,465/71
Int. Cl. C07c *169/32*
U.S. Cl. 260—397.4        19 Claims

ABSTRACT OF THE DISCLOSURE

The invention provides a novel process for the preparation of 3α-hydroxysteroids which process comprises reducing a 3-oxo-5α-steroid in the presence of an organic base using an iridium catalyst reduction system prepared from a trivalent phosphorus compound, an iridium compound and water in the presence or absence of said steroid.

The invention also includes as a new compound 3α-hydroxy-19-nor-5α-prenane-20-one.

---

This invention relates to a process for the preparation of 5α-steroids having a 3α-hydroxy group by the reduction of the corresponding 3-oxo compound.

Many 3α-hydroxy steroids have been found to possess useful properties; in particular we have found that many 5α-steroids which possess a 3α-hydroxy group have useful anaesthetic properties and this invention is particularly directed to the preparation of such compounds. The preparation of such compounds in a satisfactory state of purity and in a satisfactory yield is not easily accomplished by conventional techniques.

It has been proposed in the past to prepare 3α-hydroxy steroids by a number of different routes, one method being the reduction of a corresponding 3-oxo compound by an iridium catalyst reduction system. This method has not been widely used and there is considerable uncertainty as to the mechanism of the reactions involved. The yield of the desired product can also be less than satisfactory on account, for example, of isomerisation at the 17-position of 20-oxo pregnanes and more particularly, the formation of 3β-hydroxy isomers. It has been proposed to carry out the reduction of certain 3-oxo-5β-androstanes in the presence of sodium hydroxide (in insufficient quantity to neutralise the system) allegedly with increased reduction rate, but we have found that the presence of this base or sodium isopropoxide decreases the reaction rate with 5α-pregnanes.

We have now surprisingly found that when using an iridium catalyst system prepared from a trivalent phosphorus compound, an iridium compound and water the yield of the desired 3α-hydroxy steroid can be significantly improved if the reduction is carried out in the presence of sufficient added organic base to bring the pH substantially to neutrality and that this improvement in certain cases results from an increase in the stereospecificity of the reduction. Further, the reaction rate is in general improved, resulting in a reduction of unwanted side effects such as isomerisation at the 17-position.

We have found, additionally, that it is advantageous to pre-form the catalyst system, e.g. by relatively prolonged heating, before adding the 3-oxo-5α-steroid. This is particularly desirable using trivalent phosphorus compounds other than triesters of phosphorous acid.

According to the present invention therefore we provide a process for the preparation of 3α-hydroxy-5α-steroids which process comprises reducing a 3-oxo-5α- steriod in the presence of an organic base using an iridium catalyst reduction system prepared from a trivalent phosphorus compound, an iridium compound and water, in the presence or absence of said steroid.

The iridium compound may be for example an iridium salt or acid, such as iridium tri- and tetrahalides, e.g. iridium tetrachloride and iridium trichloride, or chloroiridic acid and its salts, e.g. ammonium or sodium chloroiridate. We prefer to use chloroiridic acid as the iridium compound.

The trivalent phosphorus compound may, for example, be hypophosphorous or phosphorous acid or more preferably an ester of phosphorous acid.

This ester may for example be a di- or tri-saturated or unsaturated aliphatic (e.g. lower alkyl having 1–6 carbon atoms), araliphatic (e.g. monocyclic, having 1–6 carbon atoms in the aliphatic portion) or an aryl (e.g. monocyclic aryl) phosphite; the ester groups may be unsubstituted or substituted e.g. by a halogen (e.g. chlorine) atom or an alkoxy (e.g. lower alkoxy having 1–6 carbon atoms) group.

Examples of suitable phosphites are trialkylphosphites and particularly easily hydrolysable phosphites such as trimethyl phosphite. Phosphites which are less readily hydrolysed may also be used, examples being triethyl, tris(2-chloro-ethyl), triallyl, and triaryl phosphites such as triphenyl phosphite. An example of a dialkyl phosphite which may be used in the reaction is di-isopropylphosphite. The reduction system usually contains an organic solvent, preferably an alcohol, in order to dissolve the steorid and other components and provide a single phase reaction medium. The solvent should of course be one in which the catalyst is stable. It is believed that where an alcohol is present it may serve as a source of hydrogen in the reduction.

Where an alcohol is used it is preferably isopropanol, but other lower alkanols (e.g. having 2–6 carbon atoms) may also be used, although methanol is sometimes less effective. Where hypophosphorous or phosphorous acid is used, however, about 2 or 3 equivalents respectively of methanol have been found to give an improved result when added, in addition to isopropanol as the main alcohol component. Isobutanol, t-butanol, isoamyl alcohol and cyclohexanol are in some circumstances as effective as isopropanol. The latter two alcohols can require increased reaction times and can lead to a reduced yield (as compared to the use of isopropanol) of the desired product. Similar considerations apply to the use of dihydric alcohols such as ethylene glycol.

Other organic solvents may be used, provided the water component can dissolve in the reaction system. Such solvents may for example include cyclic ethers such as dioxan and tetrahydrofuran. Amide solvents such as dimethylacetamide may also be used and may serve to provide the required organic base.

The relative amounts of the various constituents of the reduction system can vary considerably. It is convenient to use $6.35 \times 10^{-4}$ to $3.8 \times 10^{-2}$ moles of the iridium compound, preferably $2.5 \times 10^{-3}$ moles, per mole of the steroid to be reduced.

It is considered essential that water should be present in the reduction system. Thus, for example, isopropanol is conveniently used in the form of isopropanol containing of the order of 10–15% v./v. of water, although the amount of water used may be varied quite considerably. It is thought that at least sufficient water must be present to hydrolyse the phosphite ester but that a further quantiy is required, possibly as a hydrogen source. In general, it is found that this further quantity amounts to 0.2 to 4.0% by volume of the total reaction medium. The quantity of water required to hydrolyse the phosphite will vary with the ester concerned but is of the order of 45% by volume of the volume of ester when using trimethyl phosphite.

A further advantage of the use of a base in accordance with the invention is that when using low water concentrations, formation of 3α-ethers is substantially avoided.

We have found that if the quantity of water in the catalyst system is low it is preferable also to reduce the quantity of trivalent phosphorus compound. Although good results can be obtained using, for example, 10–15% water and not less than 5 (or even not less than 5.5 in the case of trimethylphosphite) moles of the trivalent phosphorus compound per mole of the steroid, similar yields and purities can be obtained using less than 1 mole or even as little as 0.1 moles with quantities of water calculated on the basis given above. At these low levels, however, longer times are required for pre-formation of the catalyst, e.g. up to 72 hours, but the catalyst so produced is capable of reducing the steroid comparatively rapidly so that side reactions can often be avoided.

The main bulk of the reaction medium is provided by the solvent, preferably an alcohol; this advantageously comprises sufficient of the alcohol to give a homogeneous system.

The constituents of the above-described iridium catalyst reduction system may be mixed directly with the steroid and the base to effect the reduction but, as indicated above, it is preferred that the reduction system should be preformed by reacting the constituents together before the steroid is mixed therewith. For example the iridium compound, trivalent phosphorus compound, and water, preferably with an alcohol solvent such as referred to above, may be heated together under reflux for up to 24 hours, or even up to 72 hours, to prepare the reduction system. In some cases the reduction system is stable for at least 6 months. The base may be added before or during catalyst preformation but is best added subsequently, for example together with the steroid.

The organic base which is added to the reduction system is preferably a strong base which may for example be an amine, preferably a secondary or tertiary amine such as a di- or trialkylamine (preferably having 1–6 carbon atoms in the alkyl groups) or a secondary, tertiary or aromatic heterocyclic amine. The preferred base is triethylamine, which is a strong liquid base and is generally also soluble in the reaction medium. The use of this base is particularly effective for reducing the reaction time, and thereby reducing the degree of isomerisation which can take place at the 17-position of a 20-keto pregnane, and hence increasing the yield of the desired product.

Other bases may of course be used, and examples of these are piperidine, N-ethyl piperidine, and pyridine. The latter bases give results which are comparable to those obtained with triethylamine.

Generally, sufficient base should be added to neutralise the reaction medium and it is preferred to carry out the reaction at a pH of about 7. Increasing the pH (e.g. to 8.5 in the case of triethylamine) has no adverse effect on the reaction time but there is an increase in the degree of 17-isomerisation in cases where that is possible. It is therefore generally preferred that sufficient base should be used to give a substantially neutral pH i.e. from 6 to 8.5 preferably 7.0 to 8.0 or more preferably 7.2–7.8.

Where the steroid is reacted with a catalyst system which has not been preformed, the added base may initially produce a pH above 8.5, e.g. about 9.5; the pH will however fall in the initial stage of the reaction to within the range of 6 to 8.5.

The reaction of the steroid with the reduction system and the base is generally carried out under reflux in order to solubilise high concentrations of steroid. The reaction time can vary considerably according to the particular circumstances, depending inter alia on the amount of the iridium compound present, the alcohol used, and the nature and amount of the base added. Reaction times of from 16 to 26 hours are normally required, when the components are all mixed simultaneously or when relatively short catalyst preformation times, e.g. up to 24 hours, are employed.

However, when the catalyst system is preformed by heating at reflux for 16 to 72 hours, normally using concentrations of water relative to the trivalent phosphorus compound calculated as above, the reduction is often complete in as little as 2–3 hours at reflux temperatures or about 16 hours at room temperature. Such mild reaction conditions tend to minimise side reactions such as isomerisation.

The activity of the reduction system may often be increased by carrying out the reaction in an atmosphere of hydrogen.

The process of the invention is of general applicability to 5α-steroids possessing a 3-oxo group, but, it is particularly useful in the preparation of 3α-hydroxy-5α-steroids of the pregnane or 19-nor-pregnane series. As the reduction is particularly selective with respect to the 3-oxo group, it will be appreciated that other functional groups may be present in the molecule (e.g. oxo groups at other positions in the molecule, or carbon-carbon double bonds).

Examples of groupings which may be present in the steroid nucleus are: at the 2α-position, an alkyl group (e.g. having 1–9 carbon atoms, preferably methyl) or a halogen atom e.g. a bromine atom; at the 10-position a hydrogen atom or methyl group; at the 11-position an oxo or hydroxy group; a double bond at the $\Delta^{16}$ or $\Delta^{9(11)}$ position; at the 16-position one or more alkyl groups (e.g. having 1–6 carbon atoms, such as methyl); at the 17β-position an acetyl group, which may be substituted by, for example, a group of the formula $OR^4$ where $R^4$ is hydrogen or an unsubstituted or substituted (e.g. by amino or carboxy groups) alkyl (e.g. lower alkyl having 1–6 carbon atoms), cycloalkyl, aryl (e.g. phenyl) or aralkyl (e.g. benzyl) group or an aliphatic, araliphatic or aromatic acyl group; an esterified carboxyl group, an N-mono or di-substituted carbamoyl group or a cyano group.

Thus, for example an androstane may carry a 17β-substituent of the formula —$COR^1$ where $R^1$ is (i) an alkoxy group having 1–6 carbon atoms which may be unsubstituted or substituted by a hydroxy, acyloxy or N-morpholino group; or (ii) a group of the formula

—$NR^2R^3$ wherein $R^2$ represents an alkyl group having 1–4 carbon atoms and $R^3$ represents an alkyl group having 1–4 carbon atoms or a hydrogen atom, or wherein $R^2$ and $R^3$ taken together with the nitrogen atom represents a heterocyclic ring which may contain a further nitrogen or oxygen atom.

A hydroxymethylene group may also be present at the 2-position. This is usually reduced to a 2α-methyl group during the reduction of the 3-oxo group.

An important member of the pregnane series which can be used with advantage in the process of the invention is 5α-pregnane-3,11,20-trione, which can be reduced to 3α-hydroxy-5α-pregnane-11,20-dione, which has useful anaesthetic properties. This reduction can be carried out by the process of the invention to give an increased yield of the desired 3α-hydroxy compound as compared to the best previously known method (about 86% as compared to 63%); the reduction is considerably faster so that less 17-epimerisation takes place. This result was particularly marked when the reduction system was preformed (from chloroiridic acid, trimethylphosphite and aqueous isopropanol) and triethylamine used as the base.

Similar improvements may be found in other reductions in the pregnane series, and with other iridium catalyst reduction systems and bases.

For example, again in the reduction of 5α-pregnane-3,11,20-trione using the technique just mentioned, the ratio of 3α:3β alcohols produce can vary with the phosphite used. When tris(2-chloroethyl)-phosphite or di-isopropyl phosphite were used instead of trimethylphosphite, α:β ratios of 20:1 and 14:1 were given, as compared to a ratio of 14:1 with trimethylphosphite. In comparable conditions, using trimethylphosphite but in the absence of an added base, the ratio of 3α:3β alcohol was 7:1.

The process of the invention can result in a reduction of the degree of isomerisation which takes place at the 17-position of a 20-oxo-pregnane, but in some cases it is desirable to eliminate this possibility altogether. This can be done by using a $\Delta^{16}$ steroid as the starting compound (e.g. 5α-pregn-16-ene-3,11,20-trione in the preparation of 3α-hydroxy-5α-pregnane-11,20-dione).

Thus we have found that 3α-hydroxy-5α-pregnane-11, 20-dione can be prepared in a high yield and in a high state of purity by first reducing 5α-pregn-16-ene-3,11,20-trione using the process of the invention, followed by hydrogenation (e.g. catalytic hydrogenation) of the resulting 3α-hydroxy-5α-pregn-16-ene-11,20-dione.

By applying the reduction process of the invention to 5α-pregn-16-ene-3,11,20-trione it is found, surprisingly, that the resulting mixture of 3α- and 3β-hydroxy $\Delta^{16}$-steroids can be separated by a simple crystallisation procedure (in some cases by mere addition of hot water to the reduction products) whereas the mixture of 3α- and 3β-hydroxy steroids obtained by reduction of 5α-pregnane-3,11,20-trione is significantly more difficult to separate.

The process of this invention can also conveniently be used to prepare from the corresponding 3-ketones a variety of steroids possessing anaesthetic activity such as:

(1) 3α-hydroxy-5α-pregnan-20-one,
(2) 3α-hydroxy-19-nor-5α-pregnane-11,20-dione,
(3) 3α-hydroxy-19-nor-5α-pregnan-20-one, and
(4) 2α-methyl-3α-hydroxy-5α-pregnane-11,20-dione.

Compound (3) is a new compound and is a further feature of the invention.

The above compounds may be brought into aqueous solution for use as anaesthetics for intravenous administration using the technique described in Belgian Pat. No. 752,165. For example, the compounds may be brought into solution with the aid of a physiologically acceptable non-ionic surface active agent having for example an HLB value of about 9 and preferably 9–18, and the solutions thus prepared may generally have the same composition as regards the steroid and the surfactant as described in the above Belgian patent. The compounds may be administered by the techniques and in the dosages described in Belgian Pat. No. 752,165 with reference to 3α-hydroxy-5α-pregnane-11,20-dione.

Preparative thin layer chromatography (preparative T.L.C.) was carried out on silica gel "Petrol" as used herein refers to petroleum ether (b.p. 60–80°).

The following examples (some of which are comparative) illustrate the invention. Temperatures are in °C., and percentages are by weight unless otherwise stated. All rotations were determined in about 1% w./v. chloroform unless otherwise stated. "Stock" chloroiridic acid solution was prepared by refluxing a mixture of chloroiridic acid (0.09 g.) isopropanol, containing 10% water (200 ml.) and trimethylphosphite (16 ml.) for 16 hours. The solution was neutralised with triethylamine immediately prior to use.

EXAMPLE 1

3α-Hydroxy-5α-pregn-16-ene-11,20-dione

Chloroiridic acid (0.6 g.) was added to a mixture of iso-propanol (1410 mls.), water (225 mls.) and trimethyl phosphite (195 mls.). After heating under reflux for 4½ hours the colourless solution was cooled to ca. 60° and triethylamine (247 mls.) followed by 5α-pregn-16-ene-3,11,20-trione (150 g.) was added. The mixture was brought to reflux and after a further 25 hours, water at 65° (1750 mls.) was added slowly to the stirred solution. After cooling and storage at +5° for 16 hours the white crystalline solid was filtered off, washed with water (1000 mls.) and dried in vacuo at 40° to a constant weight of 116.7 g. (77.8% w./w.; 77.3% theory), m.p. 231–237° G.L.C. (gas liquid chromatography) analysis 97.7% title compound, 1% 3β isomer.

EXAMPLE 2

Isopropyl alcohol (56.5 mls.), distilled water (9 mls.), trimethyl phosphite (7.5 mls.) and chloroiridic acid (12 mg.) were heated under reflux for 12 hours then allowed to cool. Five 12 ml. aliquots were removed and to each solution was added Flask:

(1) 5α-pregn-16-ene-3,11,20-trione (1 g.) ("trione A").
(2) Triethylamine (1.1 ml.; 0.75 moles per mole of trimethyl phosphite) and trione A (1 g.).
(3) Triethylamine (1.45 mls.; 1.0 moles per mole of trimethyl phosphite) and trione A (1 g.).
(4) Triethylamine (2.1 mls.; 1.5 moles per mole of trimethyl phosphite) and trione A (1 g.).
(5) Pyridine (0.8 mls.; 1.0 mole per mole of trimethyl phosphite) and trione A (1 g.).

Each mixture was heated under reflux for 5 hours then submitted to T.L.C. examination (Merck Kieselgel F254; benzene/ethyl acetate 1:1; visualization by ultraviolet light. The starting material has an Rf value of 0.75 and is converted into the 3-hydroxy compounds, Rf value 0.5). Samples (1), (2) and (5) had each reacted to the extent of 5%, sample (3) about 40% and sample (4) about 50%.

EXAMPLE 3

The reaction solution was prepared as in Example 2. Five 12 ml. aliquots were taken and to each was added Sample:
(1) 5α-pregn-16-ene-3,11,20-trione (1 g.) ("trione B").
(2) Triethylamine (1.45 mls.; 1 mole per mole of trimethyl phosphite) and trione B (1 g.).
(3) Triethylamine (2.18 mls.; 1.5 moles per mole of trimethyl phosphite) and trione B (1 g.).
(4) Triethylamine 2.9 mls.; 2.0 moles per mole of trimethyl phosphite) and trione B (1 g.).
(5) Pyridine (1.67 mls.; 2 moles per mole of trimethyl phosphite and trione B (1 g.).

The mixtures were heated under reflux for 5¼ hours and submitted to T.L.C. as in Example 2. Sample (1) had reacted to the extent of about 10%, samples (2) and (5) each about 50% and samples (3) and (4) each about 60%.

EXAMPLE 4

Isopropyl alcohol (56.5 mls.), distilled water (9 mls.), trimethyl phosphite (7.5 mls.) and chloroiridic acid (20 mg.) were heated under reflux for 15 hours, cooled and six 12 ml. aliquots taken. To each was added
Sample:

(1) Triethylamine (1.56 mls.; 1.08 moles of trimethyl phosphite) and trione B (1 g.).
(2) N-ethyl piperidine (1.24 mls.; 0.87 moles per mole of trimethyl phosphite) and trione B (1 g.).
(3) N-ethyl piperidine (1.57 mls.; 1.09 moles per mole of trimethyl phosphite) and trione B (1 g.).
(4) Piperidine (0.92 mls.; 0.9 moles per mole trimethyl phosphite) and trione B (1 g.).
(5) Piperidine (1.12 mls.; 1.09 moles per mole of trimethyl phosphite) and trione B (1 g.).
(6) Trione B (1 g.) only.

After heating each flask under reflux for 7 hours T.L.C. examination (as in Example 2) showed:

Sample (1) about 60% reacted.
Sample (2) about 70% reacted.
Sample (3) about 80% reacted.
Sample (4) about 70% reacted.
Sample (5) about 95% reacted.
Sample (6) about 30% reacted.

EXAMPLE 5

3α-Hydroxy-5α-pregnane-11,20-dione

Chloroiridic acid (17.3 mgm.) and trimethyl phosphite (2 ml.) and 10% aqueous isopropanol (25 ml.) were heated under reflux for sixteen hours. The pH of the solution was adjusted to 7 by addition of triethylamine and 5α-pregnane-3,11,20-trione (1 g.) added. The solution was heated under reflux for 18 hours and poured into water (200 ml.) and extracted with methylene chloride. The extracts were washed with 2% sodium bicarbonate solution and water and the solution dried ($Na_2SO_4$) and evaported to a froth (0.97 g.). G.L.C. showed three major peaks:

| | Percent |
|---|---|
| 3α-hydroxy-5α-pregnane-11,20-dione | 86 |
| 3β-hydroxy-5α-pregnane-11,20-dione | 6.3 |
| 3α-hydroxy-5α,17α-pregnane-11,20-dione | 4.9 |

A similar experiment using tris(2-chloroethyl)phosphite gave material which, by G.L.C., had an α/β ratio of 20:1. Using diisopropyl phosphite the product had a α/β ratio of 14:1.

EXAMPLE 6

3α-Hydroxy-5α-pregn-16-ene-11,20-dione

Chloroiridic acid (176 mgm.) was added to a mixture of iso-propanol (112.5 mls.), water (18 mls.) and trimethyl phosphite (15 mls.). After heating under reflux for six hours the colourless solution was cooled to ca. 60° and triethylamine (17.5 mls.) was added followed by 5α-pregn-16-ene-3,11,20-trione (12 g.). The mixture was refluxed for 18 hours, water at 80° (130 ml.) was added slowly. After cooling and storage at +5° for 16 hours, the white crystalline solid was filtered off, washed with water (100 ml.) and dried in vacuo at 40° to a constant weight of 9.57 g. (79.8% w./w.; 79.1% theory); m.p. 230–235° with slight decomposition.

| G.L.C. analysis: | Percent |
|---|---|
| Title compound | 96.7 |
| 3β-isomer | 2 |

EXAMPLE 7

3α-Hydroxy-19-nor-5α-pregnane-11,20-dione

Chloroiridic acid (0.09 g.), 10% aqueous isopropyl alcohol (200 mls.), and trimethylphosphite (16 mls.) were refluxed for 16 hours. The solution was cooled and neutralised with triethylamine. 75 mls. of this solution were refluxed with 19-nor-5α-pregnane-3,11,20-trione (0.9 g.), for 24 hours. The solution was then cooled, partitioned between water and ether and the organic layer was washed well with water, dried ($Na_2SO_4$) and evaporated. The residue was subjected to preparative T.L.C. (EtOH) and recrystallised from acetone to afford title compound (0.6 g.; 67% as white needles, m.p. 154°, [α]$_D$ +200°.

EXAMPLE 8

3α-Hydroxy-19-nor-5α-pregnan-20-one

A solution of 19-nor - 5α - pregnane-3,20-dione (0.25 g.), in chloroiridic solution as prepared in Example 7 (30 ml.) was refluxed for 24 hours. The resulting solution was then poured into water. The precipitated solid was collected by filtration, washed with water and dissolved in chloroform. The resulting solution was dried ($Na_2SO_4$) and evaporated. The residue was recrystallised from acetone/petrol to afford title compound (0.17 g., 68%) as white plates, m.p. 170–172° [α]$_D$ +120 (c 1.4).

EXAMPLE 9

3α-Hydroxy-5α-pregnan-20-one

5α-Pregnane-3,20-dione (7.0 g., 22 mmole) was added to chloroiridic acid reagent [prepared by refluxing overnight a mixture of chloroiridic acid (116 mg.), 10% aqueous isopropyl alcohol (230 ml.) and trimethyl phosphite (19 ml.), then neutralising with triethylamine] and the mixture was refluxed for 24 hours. The reaction mixture was poured into water and the product was extracted with chloroform. The combined extracts were washed with water, dried ($Na_2SO_4$) and evaporated in vacuo. Crystallisation of the residue (6.7 g.) from ethyl acetate gave title compound (4.5 g., 64%), m.p. 170–172°, [α]$_D$ +99.3° (c 0.8).

In a similar experiment, in which the triethylamine was not used and in which the reduction system was not preformed, the yield was 35%.

EXAMPLE 10

3α-Hydroxy-2α-methyl-5α-pregnane-11,20-dione

A solution of chloroiridic acid (40 mg.) and trimethyl phosphite (6 ml.) in 10% aqueous isopropanol (75 ml.) was heated under reflux for 17 hr. It was cooled and neutralised with triethylamine.

A portion of this reaction mixture (2 ml.) and 2α-methyl-5α-pregnane-3,11,20-trione (45 mg.) were heated together under reflux for 48 hr. The reaction mixture was then partitioned between water and methylene chloride. The organic layer was dried ($MgSO_4$) and evaporated to give title compound (20 mg.) with a nuclear magnetic resonance spectrum (in $CDCl_3$) showing a doublet at τ 9.07 (d, J=7 Hz.) for the 2α-methyl protons. The yield was 44%.

In a similar experiment, in which the triethylamine was not used and in which the reduction system was not preformed, the yield was 30%.

EXAMPLE 11

21-Benzyloxy-3α-hydroxy-5α-pregnane-11,20-dione

A solution of 20β,21-epoxy-3α-hydroxy-5α-pregnan-11-one (0.75 g.,) in benzyl alcohol (20 ml.) was treated with boron trifluoride diethyl etherate (0.3 ml.) at room temperature for 24 hr. The solution was then partitioned between water and ether and the organic layer was washed with water, dried ($Na_2SO_4$) and evaporated.

A solution of the residue, crude 21-benzyloxy-3,20β-dihydroxy - 5α - pregnan - 11 - one in acetone (20 ml.) was treated with excess of Jones' reagent (ca. 1.7 ml.). The mixture was then partitioned between water and ether and the organic layer was washed with water, dried

and evaporated. The residue was purified by preparative T.L.C. (EtOAc/petrol 1:1), to give 21 - benzyloxy-5α-pregnane-3,11,20-trione as white foam.

The 21-benzyloxy-5α-pregnane-3,11,20-trione obtained was treated with "stock" chloroiridic acid solution (30 ml.). The resulting solution was refluxed for 16 hr., cooled and partitioned between water and ether. The organic layer was washed with water, dried ($Na_2SO_4$) and evaporated. The residue was subjected to preparative T.L.C. ($CHCl_3$), to give title compound (0.2 g., 45% overall yield); [α]$_D$ +70° (c 1.4); λ$_{inf.}$ 230 nm. (ε 900).

EXAMPLE 12

21-Cyclopentyloxy-3α-hydroxy-5α-pregnane-11,20-dione

A solution of 20β,21-epoxy - 3α - hydroxy-5α-pregnan-11-one (0.75 g.) in cyclopentanol (20 ml.) was treated with boron trifluoride diethyl etherate (0.3 ml.) at room temperature for 24 hr. The solution was then partioned between water and ether and the organic layer was washed with water, dried ($Na_2SO_4$) and evaporated.

A solution of the residue, crude 21-cyclopentyloxy-3α,20β-dihydroxy - 5α - pregnan-11-one in acetone (20 ml.) was treated with a slight excess of Jones' reagent (ca. 1.8 ml.). The mixture was then partitioned between water and ether and the organic layer was washed with water, dried ($Na_2SO_4$) and evaporated. The residue was purified by preparative T.L.C. (EtOAc/petrol 1:1), to give 21-cyclopentyloxy-5α-pregnane - 3,11,20 - trione as a white foam.

The 21-cyclopentyloxy-5α-pregnane-3,11,20-trione obtained was treated with "stock" chloroiridic acid solution (30 ml.). The resulting solution was refluxed for 16 hr., cooled and partitioned between water and ether. The organic layer was washed with water, dried ($Na_2SO_4$) and evaporated. The residue was subjected to preparative T.L.C. ($CHCl_3$), to give title compound (0.3 g.), $[\alpha]_D$ +80° (c 1.1).

EXAMPLE 13

21-Chloroethoxy-3α-hydroxy-5α-pregnane-11,20-dione

A solution of 20β,21-epoxy-3α-hydroxy-5α-pregnan-11-one (1.0 g.) in ethylene chlorohydrin (25 ml.) was treated with boron trifluoride diethyletherate (3 drops) at room temperature for 1½ hr. The solution was then partitioned between water and ether and the organic layer was washed with water, dried ($Na_2SO_4$) and evaporated. The more polar product, crude 21-chloroethoxy-3α,20β-dihydroxy-5α-pregnan-11-one (1.3 g.) was dissolved in acetone (98 ml.) and treated with Jones' reagent (1.8 ml.) at 0° for 5 min. The resulting mixture was partitioned between water and ether and the organic layer was washed, dried ($Na_2SO_4$) and evaporated. The less polar product, crude 21-chloroethoxy-5α-pregnane-3,11,20-trione (1.2 g.) was treated with "stock" chloroiridic acid solution (36 ml.). The resulting solution was refluxed for 24 hrs., cooled and partitioned between water and ether. The organic layer was washed with saturated aqueous sodium bicarbonate and water, dried ($Na_2SO_4$) and evaporated. The residue was subjected to preparative T.L.C. (EtOAc/petrol 1:1), to give title compound (0.674 g., 55% overall yield) as a white foam; $[\alpha]_D$ +62° (c 0.9).

EXAMPLE 14

21-Chloropropoxy-3α-hydroxy-5α-pregnane-11,20-dione

A solution of 20β,21-epoxy-3α-hydroxy-5α-pregnan-11-one (1.0 g.) in 3-chloro-n-propanol (5 ml.) was treated with boron trifluoride diethyl etherate (6 drops) at room temperature for 5 hr. A further quantity of boron trifluoride diethyl etherate (6 drops) was added and the mixture was left at room temperature for a further 1½ hr. The mixture was then poured into water and the gummy precipitate was collected by filtration and washed with water. A solution of the precipitate in chloroform was dried ($Na_2SO_4$) and evaporated.

The more polar product, crude 21-chloropropoxy-3α,20β-dihydroxy-5α-pregnan-11-one (1.25 g.) was dissolved in acetone (63 ml.) and treated with Jones' reagent (1.4 ml.) at room temperature for 5 min. The mixture was partitioned between water and ether and the organic layer was washed with water, dried ($Na_2SO_4$) and evaporated.

The less polar residue, crude 21-chloropropoxy-5α-pregnane-3,11,20-trione (1.1 g.) was treated with "stock" chloroiridic acid solution. The mixture was then refluxed for 24 hr., cooled and partitioned between water and ether. The organic layer was washed with water, dried ($Na_2SO_4$) and evaporated. The residue was subjected to preparative T.L.C. (EtOAc/petrol 1:1) to give title compound (0.54 g., 45%) as a white foam, $[\alpha]_D$ +73° (c 1.3.).

EXAMPLE 15

3α-Hydroxy-21-methoxy-16α-methyl-5α-pregnane-11,20-dione

3α-Hydroxy-16α-methyl-5α-pregnane-11,20-dione (5 g.) was dissolved in dry methanol (350 ml.) and treated at 0° with a solution of bromine (1 ml.) in dry methanol (24 ml.) at such a rate that the yellow colour disappeared before further addition. After completion of the addition the mixture was poured into water. The precipitated product was dried and dissolved in chloroform (20 ml.) and put into a column of silica gel (700 g.). Elution with benzene:ethyl acetate (2½:1) gave the title compound (3.6 g.) as a foam, $[\alpha]_D$ +112.4°.

The bromo-compound (3 g.) in methanol (70 ml.) and dry tetrahydrofuran (15 ml.) was stirred with sodium borohydride (300 mg.) and water (10 ml.) for 30 min. Glacial acetic acid (0.3 ml.) was then added and the mixture was stirred with 2 N sodium hydroxide (18 ml.), for 1 hour. The mixture was poured into water, stirred and the precipitate was collected by filtration and dried at the pump to give 20β,21-epoxy-3α-hydroxy-5α-pregnan-11-one (2.7 g.), which was treated with dry methanol (125 ml.) and boron trifluoride diethyl etherate (2 ml.) with stirring for 4 hr. The solution was neutralised with saturated aqueous sodium bicarbonate and evaporated. The residue was dissolved in chloroform (250 ml.), washed with water, dried ($Na_2SO_4$) and evaporated to give 3α,20β - dihydroxy-21-methoxy-16α-methyl-5α-pregnan-11-one (2.4 g.). This dissolved in acetone (175 ml.), was treated with a slight excess of Jones' reagent until the oxidation was complete. The reaction mixture was partitioned between water and ether, the ether layer was washed with water, dried ($Na_2SO_4$) and evaporated. The total crude product was refluxed for 18 hr. in "stock chloroiridic catalyst solution" (75 ml.). The reaction mixture was partitioned between water and ether, the ether layer was washed with water, dried ($Na_2SO_4$) and evaporated. The product was purified by preparative T.L.C. (ethyl acetate:chloroform, 1:1) to give title compound (0.95 g.) $[\alpha]_D$ +84.9° (c, 1.09).

EXAMPLE 16

3α-Hydroxy-21-methoxy-5α-pregnan-20-one

A stirred solution of 3α-hydroxy-5α-pregnan-20-one (5 g.), in A.R. methanol (350 ml.) was treated at 0° with a solution of bromine (1 ml.) in methanol (23 ml.) at such a rate that the yellow colour disappeared before further addition. The resultant suspension was poured into water and stirred for 30 minutes, and the precipitate was collected by filtration and dried in vacuo. The product was purified by column chromatography. Elution with benzene:ethyl acetate (1:1) gave 21-bromo-3α-hydroxy-5α-pregnan-20-one (5.2 g.), $[\alpha]_D$ +105.5°.

The total product (5.2 g.) in methanol (200 ml.) and dry tetrahydrofuran (50 ml.) was stirred with sodium borohydride (440 mg.) and water (20 ml.). After 1 hr., glacial acetic acid (0.4 ml.) was added followed by 2 N sodium hydroxide (25 ml.) and stirring was continued for a further 2 hr. The solution was then poured into water (1 l.) and stirred for 30 minutes, the precipitated 20β,21-epoxy-3α-hydroxy-5α-pregnane (4.9 g.) was collected by filtration and dried in vacuo (4.9 g.). It was treated with A.R. methanol (225 ml.) and boron trifluoride diethyl etherate (2 ml.), with stirring, for 15 hr. The solution was then neutralised with saturated sodium bicarbonate solution and evaporated. The residue was dissolved in chloroform (500 ml.), washed with water, dried ($Na_2SO_4$) and evaporated to give 3α,20β-dihydroxy-21-methoxy-5α-pregnane (3.7 g.). This was dissolved in acetone (250 ml.) was treated with a slight excess of Jones' reagent, until oxidation was complete. The reaction mixture was partitioned between water and ether and the ether layer was washed with water, dried ($Na_2SO_4$)

and evaporated. The product was recrystallised from acetone/petrol to give 21-methoxy-5α-pregnane-3,20-dione as white needles (1.85 g.), m.p. 156°, [α]$_D$ +141° (c 0.16).

The total crude product was dissolved in "stock" chloroiridic solution (90 ml.) and the resulting solution was refluxed for 16 hours. The solution was allowed to cool and it was partitioned between water and ether. The ether layer was washed with water, dried (Na$_2$SO$_4$) and evaporated. The crystalline residue was dried in vacuo and recrystallised from acetone/petrol to give title compound (0.84 g.), m.p. 163–164° [α]$_D$ +85.4° (c 0.96).

EXAMPLE 17

3α-Hydroxy-5α-pregnane-11,20-dione (a) Chloroiridic acid (50 mg.) was dissolved in propan-2-ol (94 ml.) and water (6 ml.); trimethyl phosphite (8 ml.) was added and the solution refluxed for 24 hours. 5α-Pregnane-3,11,20-trione (1 g.) was dissolved in the chloroiridic acid reagent (25 ml.) buffered to pH 6.9 with triethylamine and the solution refluxed for 2.5 hours; it was then poured into water and the steroid extracted with chloroform. G.L.C. analysis of the product showed (approx.) title compound (88%), 3β-isomer (7%), starting material (2%) and 17α-isomer (1%).

Crystallisation from aqueous methanol gave title compound (630 mg), m.p. 163–166°.

Moisture content of chloroiridic acid reagent 3.2% w./v. (Karl Fischer).

(b) The chloroiridic acid reagent (15 ml.) prepared as in (a) above was buffered to ca. pH 7 with triethylamine; 5α-pregnane-3,11,20-trione (30 mg.) was dissolved in the reagent and the reaction allowed to stand at room temperature for 24 hours. The steroid was isolated by pouring the reaction mixture into water and extracting with chloroform. G.L.C. analysis of the product showed (approx.) title compound (89%), 3β-isomer (5%) and starting material (6%).

(c) Chloroiridic acid (50 mg.) was dissolved in propan-2-ol (97 ml.) and water (3 ml.) was added; trimethyl phosphite (4 ml.) was added and the solution refluxed for 24 hours, chloroiridic acid reagent (25 ml.), buffered to pH 6.9 with triethylamine was added to 5α-pregnane-3,11,20-trione (1 g.) and the solution refluxed for 2 hours; it was then poured into water and the steroid (1.01 g.) extracted with chloroform. G.L.C. analysis showed (approx.) title compound (90%), 3β-isomer (7%), 17α-isomer (2%) and starting material (2%).

Moisture content of chloroiridic acid reagent 2.2% w./v. (Karl Fischer).

(d) Chloroiridic acid (50 mg.) was dissolved in propan-2-ol (99 ml.) and water (1 ml.) trimethyl phosphite (1 ml.) was added and the solution refluxed for 3 days. 5α-pregnane-3,11,20-trione (1 g.) was dissolved in the chloroiridic reagent (12.5 ml.), buffered to pH 7 with triethylamine and propan-2-ol (12.5 ml.) was added. The reaction was refluxed for 3 hours, poured into water and the steroid extracted with chloroform. G.L.C. analysis showed (approx.) title compound (89%) 3β-isomer (5%) and starting material (6%).

Moisture content of chloroiridic acid reagent 0.8% (Karl Fischer).

EXAMPLE 18

3α-Hydroxy-5α-pregn-16-ene-11,20-dione

Chloroiridic acid reagent (20 ml.), prepared as in Example 17(d) was buffered to pH 7 with triethylamine; 5α-pregn-16-ene-3,11,20-dione (2 g.) was added and the solution refluxed for 2.5 hours, at this time the steroid started to crystallise. Water (30 ml.) was added and the reaction stored at 5° for 17 hours. The crystalline solid filtered off to give title compound (1.516 g., 76% w./w.), m.p. 230–233°. G.L.C. analysis showed that the product contained ca. 2% 3β-isomer and 3% starting material.

EXAMPLE 19

21-Acetoxy-3α-hydroxy-5α-pregnane-11,20-dione

Chloroiridic acid (50 mg.), propan-2-ol (94 ml.), water (6 ml.) and trimethyl phosphite (8 ml.) were refluxed for 24 hours; the solution was cooled to room temperature buffered to pH 6.9 with triethylamine and 21-acetoxy-5α-pregnane-3,11,20-trione (400 mg.) was added. The reaction was allowed to stand at room temperature for 17 hours, poured into water and the steroid extracted with chloroform. Crystallisation from acetone-petroleum ether, b.p. 40–60°, gave 21 - acetoxy-3α-hydroxy-5α-pregnan-11,20-dione (230 mg.), m.p. 180–184°.

EXAMPLE 20

3α-Hydroxy-17β-(3'-morpholinopropoxycarbonyl)-5α-androstan-11-one

A solution of 17β-(3'-morpholinopropoxycarbonyl)-5α-androstan-3,11-dione (140 mg.) in isopropanol (1 ml.) was added to a "stock" solution of the chloroiridic acid reagent (7 ml.) which had been neutralised to ca. pH 6 with triethylamine immediately prior to the addition. After refluxing for 7 hr., isolation of the product afforded a gum (150 mg.) which, after purification by preparative T.L.C., gave the title compound as a white froth; 112 mg., [α]$_D$ +51° (c 0.6).

EXAMPLE 21

Chloroiridic acid (50 mg.) was dissolved in propan-2-ol (94 ml.) and water (6 ml.); trimethylphosphite (8 ml.) was added and the solution refluxed for 24 hours. 10 ml. aliquots were removed and to each solution was added:

Sample:

(1) 5α-pregnane-3,11,20-trione (20 mg.) ("trione C"); pH 1.6.
(2) Triethylamine (0.5 mls.) and trione C (20 mg.); pH 3.3.
(3) Triethylamine (0.7 mls.) and trione C (20 mg.); pH 4.4.
(4) Triethylamine (0.77 mls.) and trione C (20 mg.); pH 4.9.
(5) Triethylamine (0.8 mls.) and trione C (20 mg.); pH 6.5.
(6) Triethylamine (0.85 mls.) and trione C (20 mg.); pH 7.2.
(7) Triethylamine (1.0 mls.) and trione C (20 mg.); pH 7.8.
(8) Triethylamine (1.2 mls.) and trione C (20 mg.); pH 8.0.
(9) Triethylamine (1.4 mls.) and trione C (20 mg.); pH 8.1.

Each mixture was allowed to stand at room temperature for 5 hours when the steroid was isolated by pouring the reaction mixture into water and extracting with chloroform. G.L.C. analysis of the products showed that sample (1) contained no 3α-hydroxy compound, sample (2) contained about 5%, sample (3) about 20%, sample (4) about 25%, sample (5) about 42%, samples (6) and (7) about 45% and samples (8) and (9) about 40% of 3α-hydroxy-5α-pregnane-11,20-dione respectively. The reactions were not taken to completion and the stated yields serve merely to compare the effect of changes in pH.

EXAMPLE 22

A mixture of isopropyl alcohol (50 ml.), water (1.83 ml.), trimethyl phosphite (4 ml.), chloroiridic acid (18.5 mgm.) and triethylamine (4 ml.) was heated under reflux for 16 hours. The 5α-pregnane-3,11,20-dione (2 g.) was added and after further refluxing for 18 hours T.L.C. showed the reaction to complete. The crude product (1.95 g.) isolated by precipitation with water, was shown by G.L.C. to consist of 85.5% of the 3α-hydroxy-5α-pregnane-11,20-dione with 5% of the 3β-hydroxy-5α-pregnane-11,20-dione.

EXAMPLE 23

A mixture of isopropyl alcohol (9.4 ml.), water (1.5 ml.), trimethyl phosphite (1.25 ml.), chloroiridic acid (5 mgm.), triethylamine (1.45 ml.), and 5α-pregn-16-ene-3,11,20-trione (1 g.) was heated under reflux. The reaction was followed by T.L.C. and was slow and only 95% complete after 42 hours. Hot water (11 ml.) was added and the product allowed to crystallise (70.23%). Gas-liquid chromatography showed it to be 96.5% pure and containing 2% 3β-isomer.

EXAMPLE 24

A mixture of isopropyl alcohol (56.5 ml.), water (9.0 ml.), trimethyl phosphite (7.5 ml.) and iridium tetrachloride (25 mg.) was heated under reflux for 18 hours. To an aliquot of 12 ml., triethylamine (1.58 ml.) and 5α-pregn-16-ene-3,11,20-trione (1 g.) were added and refluxing continued for 24½ hours by which time thin layer chromatography showed the reaction to be complete.

EXAMPLE 25

To a mixture of chloroiridic acid (4 mgm.), isopropyl alcohol (9.4 ml.), water (0.94 ml.), methanol (1.28 ml.), phosphorous acid (0.87 ml.) and triethylamine (1.45 ml.), 5α-pregn-16-ene-3,11,20-trione (1.0 g.) was added and the solution heated under reflux for 21 hours. Hot water (11 ml.) was added and the crystalline product separated in 67.8% yield with a 3α:3β-isomer ratio of 100:1.1.

EXAMPLE 26

To a mixture of chloroiridic acid (4 mgm.), isopropyl alcohol (9.4 ml.), water (0.94 ml.), methanol (1.28 ml.), hypophosphorous acid (1.1 ml.; 50% v./v. aqueous solution), and triethylamine (1.45 ml.), 5α-pregn-16-ene-3,11,20-trione (1 g.) was added and the solution heated under reflux for 24 hours. Hot water (11 ml.) was added and the crystalline product was obtained in 72% yield with a 3α:3β ratio of 100:1.

EXAMPLE 27

A mixture of chloroiridic acid (8 mgm.), dimethylacetamide (10 ml.), water (2 ml.), phosphorous acid (1.74 g.) and 5α-pregn-16-ene-3,11,20-trione (2.0 g.) was heated at 98° for 4 hours. Hot water (3 ml.) was added when the 3α-hydroxy-5α-pregnane-11,20-dione separated in 73% yield with a 3α:3β isomer ratio of 100:0.9.

PREPARATIONS (1) 11α-Hydroxy-19-norpregna-4,16-diene-3,20-dione

A solution of a mixture of 11α,17α-dihydroxy-19-norpregn-4-ene-3,20-dione (4 g.), and semicarbazide hydrochloride (4 g.) in methanol (200 ml.) was refluxed for 2 hr. The methanol was then removed by distillation under reduced pressure and water was added to the residue. The precipitated solid was collected by filtration, washed with water and dried over $P_2O_5$ in vacuo. A solution of this solid in a mixture of glacial acetic acid (80 ml.), water (28 ml.), and pyruvic acid (4 ml.) was heated on a steam bath for 1 hr. The resulting solution was concentrated under reduced pressure and partitioned between saturated aqueous sodium bicarbonate and ethyl acetate. The organic layer was washed with water, dried ($Na_2SO_4$) and evaporated to dryness. The reside was subjected to preparative T.L.C. ($CHCl_3$, $(CH_3)_2CO$; 15:1), and crystallised from acetone/petrol to afford title compound (1.6 g.), as white needles, m.p. 149°.

(2) 19-nor-5α-pregna-3,11,20-trione via 3ξ,11α,20ξ-trihydroxy-19-nor-5α-pregnane A solution of 11α-hydroxy-19-norpregna-4,16-diene-3,20-dione (2.5 g.), in dry tetrahydrofuran (200 ml.) was added over 5 mins. to a solution of lithium (5 g.) in liquid ammonia (2.5 litres). The solution was then left for 30 min. Ethanol (ca. 100 ml.) was then added until the blue colour had been discharged and the ammonia was then allowed to evaporate. The residue was partitioned between water and ether. The organic layer was washed, dried ($Na_2SO_4$) and evaporated to give crude 3ξ,11α,20ξ-trihydroxy-19-nor-5α-pregnane (1.5 g.).

A solution of crude 3ξ,11α,20ξ-trihydroxy-19-nor-5α-pregnane (4 g.) in acetone (280 ml.) was treated with a solution of potassium dichromate (8.0 g.) in 2 N-sulphuric acid (38 ml.) at room temperature for 1 hr. An additional quantity of potassium dichromate (8 g.) in 2 N-sulphuric acid (38 ml.) was then added and left at room temperature for 15 mins. The solution was then partitioned between water and ether and the organic layer was washed with water, dried ($Na_2SO_4$) and evaporated. The residual oil was subjected to preparative T.L.C. ($CHCl_3$) and recrystallised from acetone/petrol to afford 19-nor-5α-pregnane-3,11,20-trione (1.04 g., 25%) as white prisms, m.p. 151°, $[\alpha]_D$ +240°.

Jones' Reagent

Jones' reagent refers to a solution of chromium trioxide (267 g.) in a mixture of concentrated sulphuric acid (230 ml.) and water (400 ml.) made up to 1 litre with water (8 N w.r.t. oxygen).

(3) 20,20-Ethylenedioxy-2-hydroxymethylene-5α-pregnane-3,11-dione

Sodium hydride (0.13 g.) was added, with stirring, to a cooled solution of 20,20-ethylenedioxy-5α-pregnane-3,11-dione (0.3 g.) and ethyl formate (0.3 ml.) in dry benzene (6 ml.) under nitrogen. The reaction mixture was kept at room temperature for 24 hr. and then evaporated to dryness in vacuo. Aqueous hydrochloric acid (2 N) was added to the residue and after stirring for 30 minutes the solid (0.33 g.) was collected by filtration. Treatment with charcoal and crystallisation from methyl acetate/petrol gave title compound (0.126 g., 39%), m.p. 149–151°, $[\alpha]_D$ +121° (c 0.5), $\lambda_{max.}^{EtOH}$ 285 nm. (ε 7,800).

(4) 20,20-Ethylenedioxy-2α-methyl-5α-pregnane-3,11-dione

A solution of chloroiridic acid (30 mg.) and trimethyl phosphite (4.5 ml.) in 10% isopropanol (60 ml.) was heated under reflux for 17 hr.

The solution was then neutralised with triethylamine and 20,20 - ethylenedioxy 2-hydroxymethylene-5α-pregnane-3,11-dione (2 g.) was added. The mixture was heated under reflux for 40 hr. then cooled and partitioned between water and methylene chloride. The organic layer was dried ($MgSO_4$) and evaporated in vacuo. The residue (1.94 g.) was subjected to preparative T.L.C. giving two fractions. The less polar fraction (0.18 g.) was crystallised from methanol to give title compound (0.13 g.), m.p. 179–180° C., $[\alpha]_D$ +77.5°.

(5) 2α-Methyl-5α-pregnane-3,11,20-trione

A solution of 20,20 - ethylenedioxy - 2α - methyl-5α-pregnane-3,11-dione (0.39 g.) and toluene-p-sulphonic acid (30 mg.) in acetone (30 ml.) was kept at room temperature for 1½ hr.

The solution was then evaporated to low bulk and an aqueous solution of sodium hydrogen carbonate added. The solid was collected by filtration. Crystallisation from methyl acetate/petrol gave the title compound (0.21 g.), m.p. 176°, $[\alpha]_D$ +136°.

(6) 3α-Hydroxy-16α-methyl-5α-pregnane-11,20-dione

To a stirred slurry of cuprous iodide (950 mg.), in dry ether (75 ml.) under dry nitrogen at 0° was added a solution of methyl-lithium in ether (c. 1.6 M; 6 ml.) until the initially formed yellow precipitate just redissolved to give a clear solution. To the stirred solution at 0° was added a solution of 3α-hydroxy-5α-pregn-16- ene-11,20-dione (600 mg.), in dry tetrahydrofuran (50 ml.). During the addition a bright yellow precipitate formed. The mixture was stirred at 0° for 30 minutes, and then poured into cold, saturated ammonium chloride solution. More ether was added, and the organic layer was separated, washed with saturated ammonium chloride solution and with water dried over sodium sulphate and purified by preparative T.L.C. in ethyl acetate to give a product which was further purified by preparative T.L.C in ethyl acetate/chloroform (1/1) to give a white solid (380 mg.), which was recrystallised from ether/petrol to give title compound (248 mg.) as colourless plates, m.p. 138–140°, $[\alpha]_D$ +99°, $c$ 0.95.

(7) 21-Bromo-3α,20β-dihydroxy-5α-pregnan-11-one

Crude, unchromatographed 21-bromo-3α-hydroxy-5α-pregnane-11,20-dione (411 mg.), in methanol (25 ml.) and water (5 ml.) was stirred at room temperature with sodium borohydride (39 mg.). After 90 minutes acetic acid (0.1 ml.) was added, the solution was evaporated to small bulk and partitioned between water and chloroform. The organic phase was dried ($Na_2SO_4$) and evaporated under reduced pressure to a white froth (438 mg.). This was subjected to preparative T.L.C. (40 g.) the plates being eluted twice with chloroform. The main component was obtained as a white solid (200 mg.) which recrystallised from ether as colourless needles (86 mg.) of title compound, m.p. 195–197°, change of crystalline form at 180–183°; $[\alpha]_D$ +45.7°, $c$ 1.16.

(8) 20β,21-Epoxy-3α-hydroxy-5α-pregnan-11-one

A solution of 21-bromo-3α-hydroxy-5α-pregnane-11,20-dione (1.18 g.) in methanol (75 ml.) was stirred with a solution of sodium borohydride (110 mg.) in water (15 ml.) at room temperature. After one hour, glacial acetic acid (0.15 ml.) was added, and the resultant solution was stirred with 2 N sodium hydroxide (6 ml.) under nitrogen. After 1½ hours, the solvent was evaporated, and water was added. The mixture was stirred for 1 hour and filtered. The residue was washed with water and dried to yield title compound, 784 mg., as very fine needles; m.p. 231–236.

We claim:

1. A process for the preparation of a 3α-hydroxy-5α-steroid of the pregnane, 19-nor-pregnane, androstane or 19-nor-androstane series, which process comprises reducing a 3-oxo-5α-steroid of one of said series in the presence of an organic base using an iridium catalyst reduction system prepared from a trivalent phosphorus compound selected from the group consisting of hypophosphorous acid, phosphorous acid and an ester of phosphorous acid, an iridium compound selected from the group consisting of an iridium trihalide, an iridium tetrahalide, chloroidic acid and a salt of chloroiridic acid and water in the presence or absence of said steroid.

2. A process as claimed in claim 1 wherein the catalyst system is pre-formed and the steroid and base are subsequently mixed therewith.

3. A process as claimed in claim 1 wherein the reduction is carried out in the presence of an organic solvent for all the reaction components.

4. A process as claimed in claim 3 wherein the organic solvent is isopropanol.

5. A process as claimed in claim 1 wherein the iridium compound is chloroiridic acid.

6. A process as claimed in claim 1 in which the trivalent phosphorus compound is a trialkyl phosphite.

7. A process as claimed in claim 6 wherein the phosphite is trimethyl phosphite.

8. A process as claimed in claim 1 wherein the organic base is a secondary or tertiary amine.

9. A process as claimed in claim 8 wherein the base is triethylamine.

10. A process as claimed in claim 1 wherein sufficient base is used to give a pH of 6.0 to 8.5.

11. A process as claimed in claim 1 wherein the catalyst system is prepared from $6.35 \times 10^{-4}$ to $3.8 \times 10^{-2}$ moles of the iridium compound and not less than 5 moles of the phosphorus compound per mole of the steroid.

12. A process as claimed in claim 1 in which a 3α-oxo-5α-steroid of the 20-oxo-5α-pregnane or 19-nor-pregnane series is reduced.

13. A process as claimed in claim 12 wherein the starting 3-oxo pregnane also possesses an 11-oxo group.

14. A process as claimed in claim 12 wherein the starting steroid is a $\Delta^{16}$ steroid.

15. A process as claimed in claim 1 in which the catalyst system is preformed in the absence of steroid and base by heating under reflux for 16 to 72 hours.

16. A process as claimed in claim 14 in which the trivalent phosphorus compound is phosphorous acid or hypophosphorous acid.

17. A process as claimed in claim 16 in which the reaction mixture contains a quantity of methanol equivalent to that in a methyl ester of said acid.

18. A process as claimed in claim 1 in which, when the trivalent phosphorus compound is other than an ester of phosphorous acid the catalyst system is preformed in the absence of said steroid.

19. 3α-Hydroxy-19-nor-5α-pregnan-20-one.

References Cited.

Merck Index, 8th ed., 1968.

HENRY A. FRENCH, Primary Examiner

U.S. Cl. X.R.

260—239.55 R, 397.45, 397.47, 999